E. L. STEENDAHL.
TOY TRAIN AND METHOD OF MAKING THE SAME.
APPLICATION FILED DEC. 17, 1917.
1,283,591.
Patented Nov. 5, 1918.
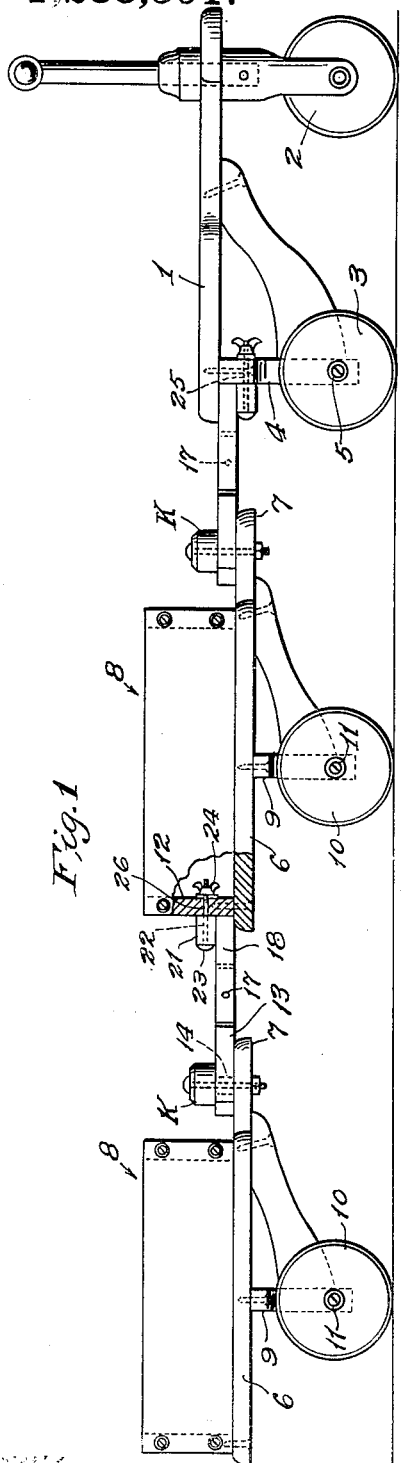
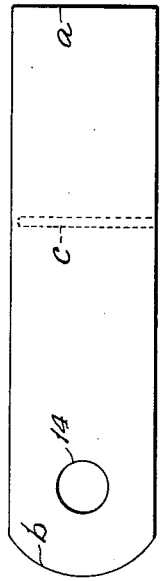
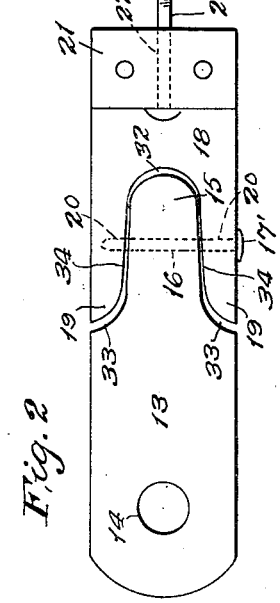
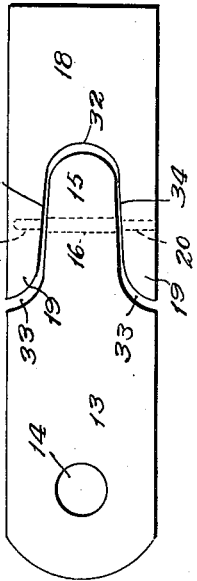
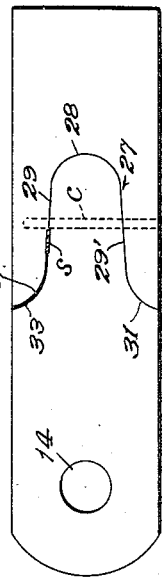
Inventor
Earl L. Steendahl

UNITED STATES PATENT OFFICE.

EARL L. STEENDAHL, OF LOS ANGELES, CALIFORNIA.

TOY TRAIN AND METHOD OF MAKING THE SAME.

1,283,591.  Specification of Letters Patent.  Patented Nov. 5, 1918.

Application filed December 17, 1917. Serial No. 207,638.

*To all whom it may concern:*

Be it known that I, EARL L. STEENDAHL, a citizen of the United States, residing at 257 South Norton avenue, in the city of Los Angeles, county of Los Angeles, and State of California, have invented new and useful Improvements in Toy Trains and Methods of Making the Same, of which the following is a specification.

This invention relates to improvements with respect to a vehicular toy for which I filed an application for Letters-Patent of the United States Oct. 1, 1917, Serial No. 194,278.

The invention referred to relates to a train of two or more toy cars comprising wheel-supported platforms coupled together; and the present invention relates more particularly to the means which I have provided for connecting any trailer car in the train to the toy vehicle directly in front of it, and the method of making such coupling means.

An object of the invention is to provide a cheap and simple coupling adapted to accommodate all the different relative motions which are likely to occur between the two cars that are connected by such coupler.

The bodies of the cars referred to are provided at the rear with vertical walls. The rear vertical wall for the front car is under the car platform and is a bolster which supports the rear end of such platform. The vertical walls of the trailer cars are the rear walls of bodies or boxes mounted upon the platforms of the trailer cars. The trailer cars have their platforms on a common level which is lower than the level of the platform of the front car; and an object of the invention is to provide a single coupling contrivance which will be cheap and simple of construction, and not likely to hurt or injure the child playing with the toy; and which will apply to connect a trailer car to either the front car or the trailer car as may be desired.

An object of this invention is to provide a cheap and simple, easily-made coupler adapted for ready use in coupling the cars of such a train; the same coupler being adapted to connect the trailer to the head car or to connect two trailer cars together.

In the manufacture of toys of this kind it is very important that every economy be exercised; for the reason that such cars are made in such large quantities that a small economy for each affords good profits to the manufacturer with low prices to the purchasers.

An object, therefore, is to minimize the cost of making the coupler, also to minimize the time and labor of coupling the cars together.

In order to make the couplers between such cars thoroughly satisfactory, it is necessary that they be of a nature to allow undulatory movement of the train so that the cars may go over irregularities of the ground and also allow lateral relative movement of the cars to permit the train to readily turn corners and to move in any required direction.

An object is to make provision for such motions with minimum expense.

Other objects and advantages may appear from the accompanying drawings, the subjoined detail description and the appended claims.

The accompanying drawings illustrate the invention.

Figure 1 is a side elevation of a toy train constructed in accordance with this invention and comprising a front car and two trailers.

Fig. 2 is a plan of one of the couplers detached.

Fig. 3 is a plan of a bored wooden blank from which two elements of a coupler may be cut.

Fig. 4 is a view analogous to Fig. 3 showing the bored blank partly sawed. The scroll saw is shown in cross section.

Fig. 5 is a plan view of the severed sections of the blank after the cusp has been rebored and the sections placed in position to receive the hinge pin or pintle. The block is not shown in this view.

The front car is provided with a platform 1, a tiller wheel 2, a pair of rear wheels 3 and a bolster 4 in the usual form of construction. Said bolster 4 is a vertical piece of board, to the top of which the platform 1 is fastened and to the ends of which the rear wheels 3 are journaled by the spindles 5.

The trailer cars are each provided with a platform or box floor 6 below the level of the front platform 1, and having a forward projection 7 and also having a box 8 on top and a bolster 9 underneath, to which bolster the wheels 10 are journaled by the spindles 11.

The box 8 is provided with a rear vertical wall 12.

The coupler comprises a rear swivel piece 13 having a king bolt bore or hole 14 therethrough and adapted to be connected by the king bolt K to the forward projection 7 of the trailer platform. The swivel piece terminates at its front end in a tongue 15 that has a transverse bore 16 extending through it from edge to edge to loosely accommodate or fit a coupling pin 17. Said coupler also comprises a forward forked member 18, the forks 19 of which are conformed to the front end or tongue 15 of the rear swivel member 13. Said forks are provided with transverse bores 20 into which is driven the horizontal coupling pin 17 that extends loosely through the bore 16 and connects the front tongue 15 of the rear coupling member with the rear forks of the front coupling member.

The rear end of the rear coupling member is semi-circular as with the coupling in the former application for patent and the front end of the front coupling member is cut square across and is supplemented by a block 21 fastened to one side of the front coupling member flush with the front end thereof. Said block is perforated with a horizontal bolt hole 22 that is parallel with the longitudinal axis of the front coupling member. A coupling bolt 23 is inserted through the block 21 and projects from the front side thereof a sufficient distance through the rear upright wall formed by either the bolster 4 of the front car or the rear wall of the box of a trailer car. A nut 24 on the front end of the bolt serves to secure the bolt in the bolt hole of the bolster or of the rear upright wall of the box as occasion may demand. Horizontal holes 25 and 26 are provided in the bolster 4 and rear wall 12 respectively to receive the bolt 23.

The platforms of the trailer cars are all on a common level which is lower by the thickness of the coupling than the platform of the front or head car. The thickness of the coupling and of the platforms is the same, so that when a trailer provided with a coupler is to be coupled to a front or head car, the coupler will be applied to the front projection of the trailer car with the block turned down as shown above the character 4 in Fig. 1; and consequently, the thin top face of the front member of the coupler fits snugly under the platform 1 of the front car and such front end and the block abut against the bolster 4 and the bolt extending from the front of the block may be inserted through the hole 25 in the bolster and secured by the nut. A trailer car that is to be coupled behind another trailer car will be prepared for such coupling by turning its coupler upside down as compared with the coupler of the trailer first described, so that the block will be on the upper side of the coupling device. The coupler is thus brought into position to engage the upright rear wall 12 above the floor, and the bolt is then inserted through the hole 26 in such wall, and is then secured by the appropriate means therefor, which, in the case illustrated, is a nut. By this arrangement the same character of coupling appliance is adapted for coupling all of the cars of a train of cars together, irrespective of whether the trailer is connected to the head car or to a trailer; all that is necessary being to apply the coupler to the trailer with the block uppermost or undermost as occasion may demand.

In this way only one form of coupler is required for the two modes of coupling. This is regarded as a matter of considerable economy in making ready, manufacturing and assembling.

The method of manufacturing the coupler may be understood by reference to Figs. 3, 4 and 5.

The board blank shown in Fig. 3 is made by sawing a blank from a strip of wood, about an inch, more or less, thick; one end $a$ of said blank being cut square across and the other end $b$ being rounded. The bores 14 and $c$ in this blank may then be simultaneously bored by a boring machine or otherwise bored to provide the king bolt bore 14 and coupling pin bore; the produced axial plane of said bores being normal to each other. The bored piece is then sawed with a band saw or scroll saw S along a line 27 formed with a rounded cusp 28, intermediate practically straight sides 29, 29' and rear diverging diverse curves 30, 31. The coupling pin bore $c$ extends edgewise of the blank from one edge of said blank entirely through the cusp thus indicated, and nearly to the other edge of the blank; but preferably does not extend entirely through the blank. Such hole is of somewhat less diameter than the coupling pin, and when the blank has been sawed in two to form the front and rear members, the rear member may be put into a boring machine and its coupling pin hole 16 rebored to the diameter of the coupling pin 17, so that in the act of assembling the coupling pin must be forcibly driven into the fork, but will loosely fit the hole 16. By this method the coupling joint hinges freely without loosening the pin in the forks thereby giving greater durability to the car.

The coupling pin may be any suitable form of a nail with or without the head which is shown at 17', or it may be a pin cut square off as indicated in Fig. 1.

It is thus seen that I have provided for a toy train in which there is a head car and a plurality of trailer cars, one of said cars having an upright wall below a platform and the others having an upright wall above a platform; a coupler practically formed as a single piece of board affording a practical universal joint form of coupler which is reversible and invertible and is adapted to interchangeably couple a trailer to a head car or to a trailer and yet is made at low cost and is safe and satisfactory and harmonious in its application to the car.

When the parts of the coupler are hinged together by the pin 17 the slack of the loose joint at 16 allows the two members 13 and 18 to be stretched apart or relatively shifted somewhat from the position the respective bodies thereof occupied before they were completely severed; this shifting increases the width of the open spaces at the turn or curve 32, at the front of the tongue and the curves 33 at the rear of the forks as compared with the nearly parallel intermediate limbs 34 which are nearly in parallelism with the longitudinal axis of the coupler.

In consequence of this construction, the two members of the coupling do not interfere with each other and they oscillate freely on the horizontal pin 17 sufficiently to accommodate all the undulations of the train passing over uneven ground. The front member of each coupler is rigid to the car to which it is attached and the train is adapted to turn curves and corners without interference of one car with another.

I claim:—

1. A toy train comprising a front car provided with a platform and a bolster below such platform; trailer cars each provided with a platform of the same height as that of the other and lower than that of the front car, and couplers of a uniform construction each comprising a member having a tongue and a member having a fork to fit the tongue, one of said members having upon one side a block perforated with a hole extending in parallelism with the axis of such member; a bolt through said hole engaging the upright with which the block engages; said couplers being inverted and interchangeable.

2. A toy train comprising cars having platforms, the platform of one of said cars being on a higher level than the platforms of the other cars, and said cars being also provided with uprights fixed to said platforms, an upright of the higher platform being beneath such platform, and an upright of the lower platform being above its platform; and couplers for said cars, each of said couplers comprising two members hinged together and one of the members of each coupling being provided with a lug on one side; said lug being perforated in parallelism with the longitudinal axis of the coupler and made to abut an upright of the car in front; and bolts extending through said lugs and the uprights with which they coöperate.

3. A coupler for cars of a toy train comprising two members forming practically a single piece severed by a curved saw kerf; one of said members having a forwardly extending tongue and the other member having a fork to accommodate said tongue, and a pin through said tongue and folk to hinge the members together.

4. A coupler for cars of a toy train comprising two members forming practically a single piece severed by a curved saw kerf; one of said members having a forwardly extending tongue and the other member having a fork to accommodate said tongue, and a pin through said tongue and fork to hinge the members together, one of said members having a vertical bore to accommodate a king bolt and the other member having a lug on one side and having a horizontal hole through the lug to accommodate a bolt for the purpose of fastening the lug to a car.

5. The coupler for toy cars comprising two members constructed practically of a single strip of board formed in two pieces, one having a tongue and the other forks to accommodate the tongue; said tongue and forks having a hole extending edgewise of the strip, through one of the forks, through the tongue and part way through the other fork and a pin fixed tightly in the holes in said forks and extending through the tongue, the hole in the tongue loosely accommodating the pin.

In witness whereof, I have hereunto set my hand at Los Angeles California this 10th day of December 1917.

EARL L. STEENDAHL.

Witness:
JAMES R. TOWNSEND.